US008209696B2

(12) United States Patent
Ferguson et al.

(10) Patent No.: US 8,209,696 B2
(45) Date of Patent: *Jun. 26, 2012

(54) METHOD AND SYSTEM FOR LOAD BALANCING A DISTRIBUTED DATABASE

(75) Inventors: Gregory Ferguson, Oakville (CA); Jeffrey Heisz, Toronto (CA); David Tung, Toronto (CA); Muhammad Mansoor Jamal, Toronto (CA); Ariff Kassam, North York (CA)

(73) Assignee: Teradata US, Inc., Dayton, OH (US)

( * ) Notice: Subject to any disclaimer, the term of this patent is extended or adjusted under 35 U.S.C. 154(b) by 1443 days.

This patent is subject to a terminal disclaimer.

(21) Appl. No.: 11/674,533

(22) Filed: Feb. 13, 2007

(65) Prior Publication Data

US 2007/0203910 A1    Aug. 30, 2007

Related U.S. Application Data

(60) Provisional application No. 60/772,581, filed on Feb. 13, 2006.

(51) Int. Cl.
*G06F 9/46* (2006.01)
*G06F 7/00* (2006.01)
(52) U.S. Cl. .................................... 718/104; 707/704
(58) Field of Classification Search .......... 718/104; 707/704
See application file for complete search history.

(56) References Cited

U.S. PATENT DOCUMENTS

| | | | |
|---|---|---|---|
| 5,675,791 A | 10/1997 | Bhide et al. | |
| 5,781,910 A | 7/1998 | Gostanian et al. | |
| 6,263,433 B1 | 7/2001 | Robinson et al. | |
| 6,421,688 B1 | 7/2002 | Song | |
| 6,668,270 B1 | 12/2003 | Simmons et al. | |
| 6,708,198 B1 | 3/2004 | Simmons et al. | |
| 6,715,146 B1 | 3/2004 | Simmons et al. | |
| 6,898,609 B2 | 5/2005 | Kerwin | |
| 6,950,848 B1 | 9/2005 | Yousefi'zadeh | |
| 7,158,976 B1 * | 1/2007 | Longinov et al. | 1/1 |
| 2002/0129097 A1 | 9/2002 | Jia | |
| 2004/0220933 A1 * | 11/2004 | Walker | 707/8 |
| 2006/0101081 A1 * | 5/2006 | Lin et al. | 707/200 |
| 2006/0129528 A1 * | 6/2006 | Miyamoto et al. | 707/3 |
| 2007/0061379 A1 | 3/2007 | Wong et al. | |
| 2007/0156765 A1 * | 7/2007 | Hubbard et al. | 707/200 |
| 2008/0046400 A1 | 2/2008 | Shi et al. | |

OTHER PUBLICATIONS

Amza et al, Scaling and Availability for Dynamic Content Web Sites, Technical Report TR02-395, Rice University, 2002, 17 pages.
Amza et al, Conflict-Aware Scheduling for Dynamic Content Applications, 5th USENIX Symposium on Internet Technologies and Systems, Mar. 2003, 14 pages.
Amza, Conflict-Aware Replication for Dynamic Content Web Sites, Thesis, Rice University, May 2003, 114 pages.

* cited by examiner

*Primary Examiner* — Meng An
*Assistant Examiner* — Brian Chew
(74) *Attorney, Agent, or Firm* — James Stover

(57) ABSTRACT

A method of processing a transaction request at a database load balancer. The method comprises receiving the transaction request, where the transaction request is comprised of one or more operations; analyzing the transaction request to determine the one or more operations; associating one or more database locks with each of the one or more operations; analyzing one or more of the database locks to determine the one or more sequence numbers associated with each of the one or more operations; and transmitting the one or more operations with the associated database locks and the sequence numbers to one or more databases servers accessible to the database load balancer.

49 Claims, 9 Drawing Sheets

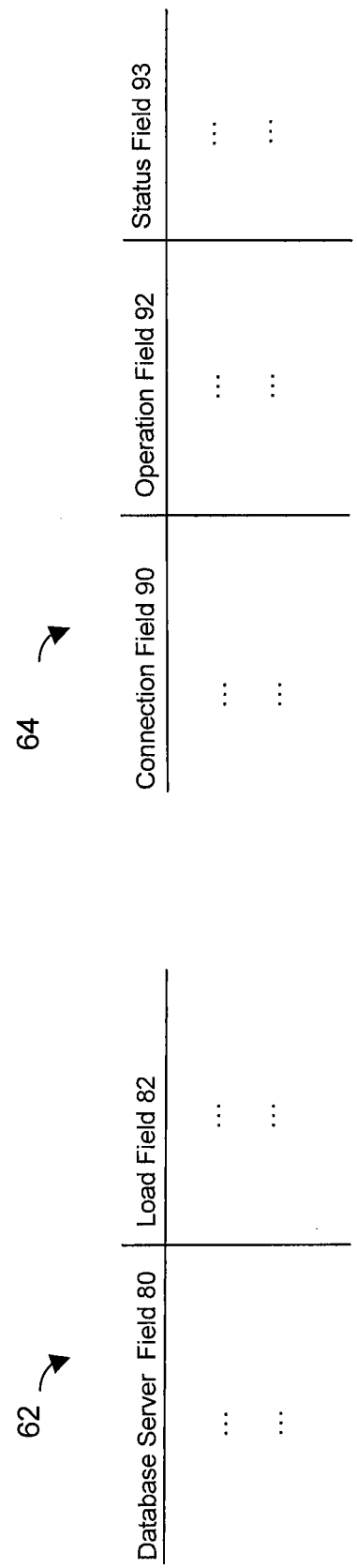
FIG. 4
FIG. 5
FIG. 6A

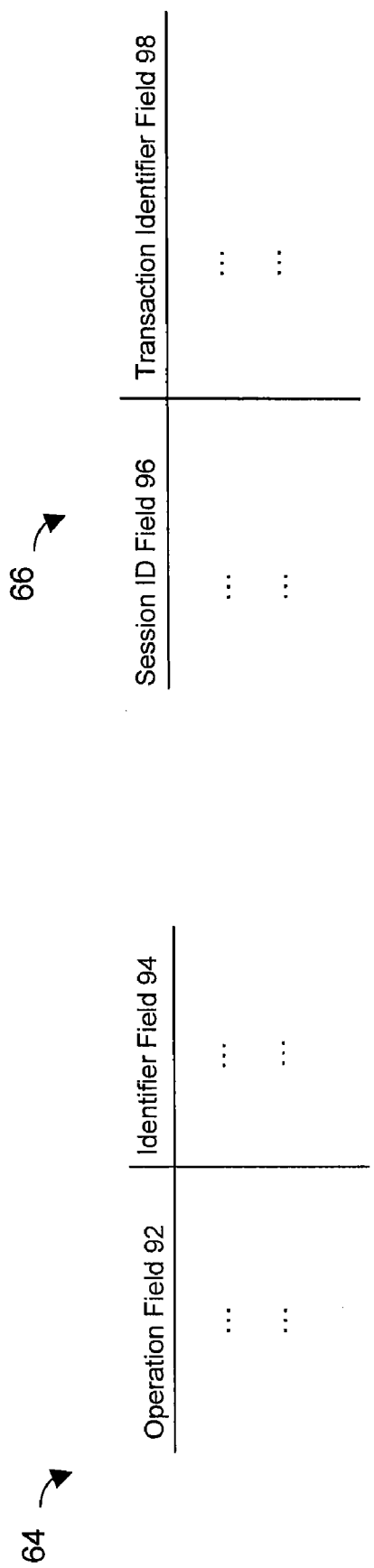

METHOD AND SYSTEM FOR LOAD BALANCING A DISTRIBUTED DATABASE

This application claims priority from U.S. Provisional Application No. 60/772,581 filed Feb. 13, 2006.

FIELD OF THE INVENTION

The invention relates generally to the field of database applications, and more specifically to a method and system for load balancing a distributed database.

BACKGROUND OF THE INVENTION

Many hardware/software applications rely on a database for the storage of data records. A database may generally be defined as a collection of records stored upon a hardware device in a systematic way.

As the need to store increased amounts of data grows, so does the need to efficiently store and access the data. Databases are used to store large volumes of data, and therefore the applications that are used to write to them, and read from them, need to be implemented to make the most efficient use of the databases.

Regardless of the volume of data stored upon a database, databases will generally have two elements in common, the first being a means by which data records may be stored, and the second a locking mechanism. The locking mechanism controls access to the data records stored on the database.

Where large volumes of data are being stored on a database, or a large number of requests are made for the data, a bottleneck often develops where the database is not able to serve the read and write requests fast enough. Examples of such bottlenecks are found in many applications and environments. Bottlenecks may occur for a variety of reasons, including, but not limited to, where the database is experiencing too heavy a load (too many requests are being made to the database), the task the database is being asked to perform is performed inefficiently (therefore slowing down response times), or where the database does not possess the required processing ability to respond to the request in an efficient manner.

One solution proposed to deal with database bottlenecks is to store the database upon a server with increased processing ability. There are several drawbacks to such an approach. One such drawback involves the cost of the server and associated software, as the cost often increases exponentially with the processing capability of the server. Another drawback relates to when provisions are being made for availability or disaster recovery, where an additional significant cost is encountered in acquiring and maintaining a second server of equivalent size and cost that is idle and does not contribute to the data processing ability (otherwise there is still a single point of failure in the system).

Another solution to address the database bottleneck problem, is to utilize a cluster of smaller database servers which process the data records and which utilize a single, common device for the storage of the database records (i.e. only a single copy of the database records exists). This solution does provide a lower cost incremental capability for increasing the processing ability of the database (augmented by adding new servers) but still can encounter a bottleneck for the shared storage resource.

Yet another solution is to use a cluster of database servers, where each server has its own private and identical set of database records (a plurality of database servers) along with a separate, centralized device that virtualizes (to external clients) the cluster of database servers into a single database instance. This external device is then responsible for ensuring that all database requests and transactions are delivered to each of the database servers in the cluster in a way that ensures the accuracy and consistency of the database records. There are several algorithms used for performing this distribution. Some algorithms used to implement this solution require the completion of all operations associated with a particular transaction before the next transaction is executed, even when it is not necessary to wait for the completion of the preceding transaction. Such algorithms therefore do not make efficient use of the multiple database resources that are available for use.

SUMMARY OF THE INVENTION

In accordance with a first aspect of the invention, there is provided a method of processing a transaction request at a database load balancer. The method comprises receiving the transaction request, where the transaction request is comprised of one or more operations; analyzing the transaction request to determine the one or more operations; associating one or more database locks with each of the one or more operations; analyzing one or more of the database locks to determine the one or more sequence numbers associated with each of the one or more operations; and transmitting the one or more operations with the associated database locks and the sequence numbers to one or more databases servers accessible to the database load balancer.

In accordance with a second aspect of the invention, there is provided a method of processing a transaction request at a database server. The method comprises receiving the transaction request comprised of one or more operations, where the operations have associated sequence and lock information; analyzing the sequence information; placing the operations in an appropriate location in record queues and a session queues based on the analysis of the sequence information; and analyzing the record queues and session queues to determine the operations that are to be executed.

BRIEF DESCRIPTION OF THE DRAWINGS

For a better understanding of embodiments of the system and methods described herein, and to show more clearly how they may be carried into effect, reference will be made by way of example, to the accompanying drawings in which:

FIG. 4 is a diagram illustrating the fields of the scheduler table;

FIG. 5 is a diagram illustrating the fields of the database load table;

FIG. 6A is a diagram illustrating the fields of the log table in one embodiment;

FIG. 6B is a diagram illustrating the fields of the log table in an alternative embodiment;

FIG. 6C is a diagram illustrating the fields of the transaction table;

DETAILED DESCRIPTION OF THE INVENTION

Figure 1:
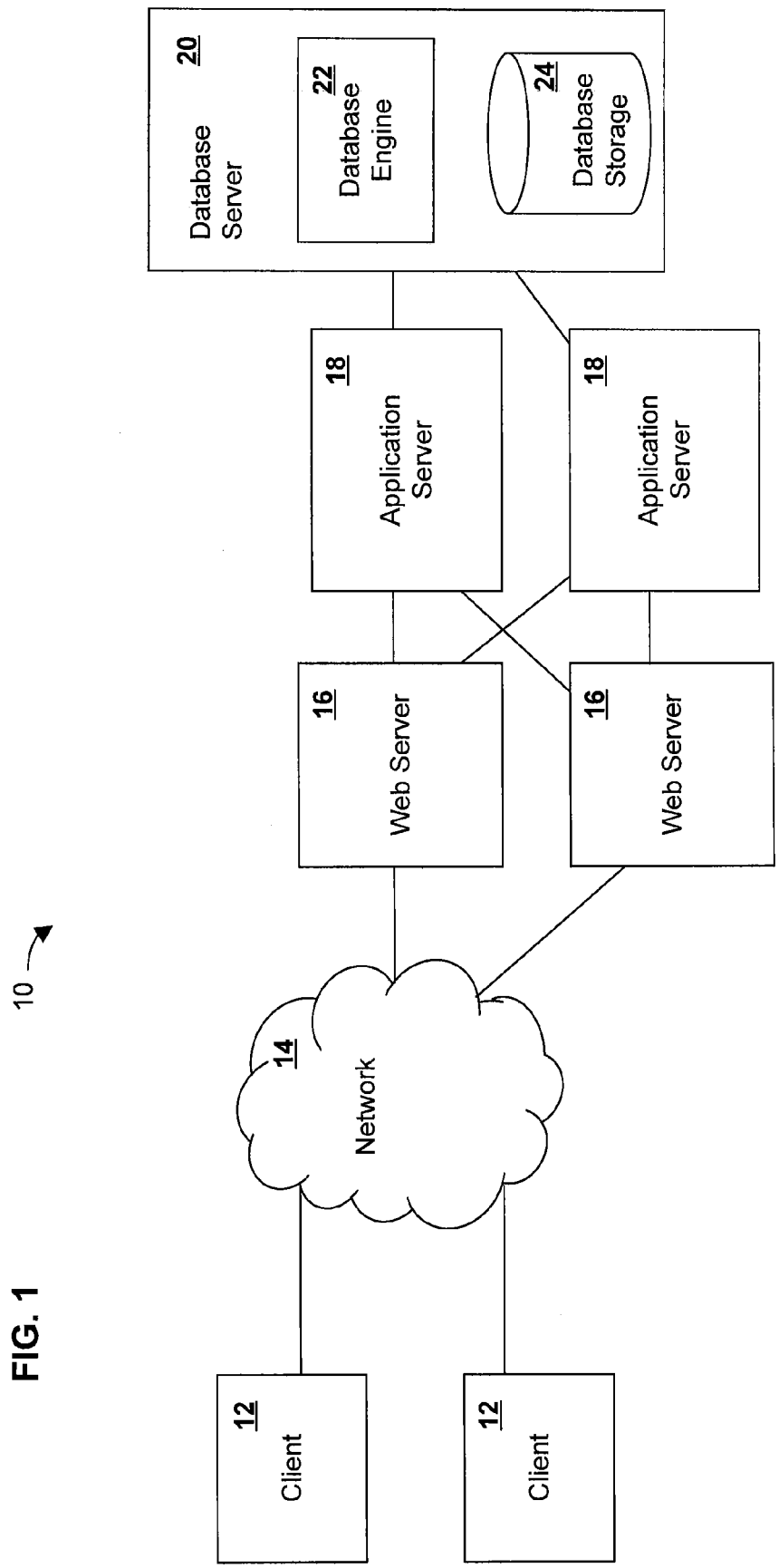
FIG. 1 is a block diagram of a network environment where one database storage is used on a single database server.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, or cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Reference is now made to FIG. 1, where an example configuration of components used to access a database in a network environment 10 is shown. FIG. 1 illustrates the interaction between one or more clients 12, a network 14, one or more web servers 16, one or more application servers 18, a database server 20, a database engine 22, and the database storage 24. The network environment 10 is referenced to illustrate one environment where multiple applications/servers rely on one database storage 24 running on a single database server 20. There are innumerable other environments, systems, and architectural arrangements, where multiple clients/applications are dependent on the contents of a single database storage 24. In FIG. 1, a plurality of client machines 12 are shown interacting with one or more web servers 16, and one or more application servers 18, through a network 14. The network 14 may be any network that allows for communication between devices and for purposes of this example, is the Internet. The client 12 interacts with the servers and their respective applications and makes a request relating to a database record. The requests may include various database operations including, but not limited to, specific data read or write operations as well as operations associated with record metadata and transactional consistency (e.g. commit and rollback operations). The term database record is used to represent instances of data stored on the database storage 24. For example, database records may exist in various formats, including but not limited to, a table format, an array format, a row format, a column format, or even as single instance data entries. The database server 20 has stored upon it, or accessible to it, the database engine 22. The database engine 22 manages the storage of database records upon the database storage 24. The database engine 22 is the software application that controls access to the database storage 24, which may be on the database server 20 or accessible to it. The database server 20 receives the requests, and proceeds to transmit the respective operations that make up the request to the database engine 22 for execution. The database server 20 is only able to serve a certain number of requests due to the inherent limitations faced by itself and the database storage 24. The database limitations may include, but are not limited to, contention for simultaneous access to common database records, processing power, time of response, and storage capabilities (read/write rates). As a result, the database server 20 may at times be unable to serve the requesting server/application in as timely manner as is required, and database bottlenecks develop as a result.

Figure 2:
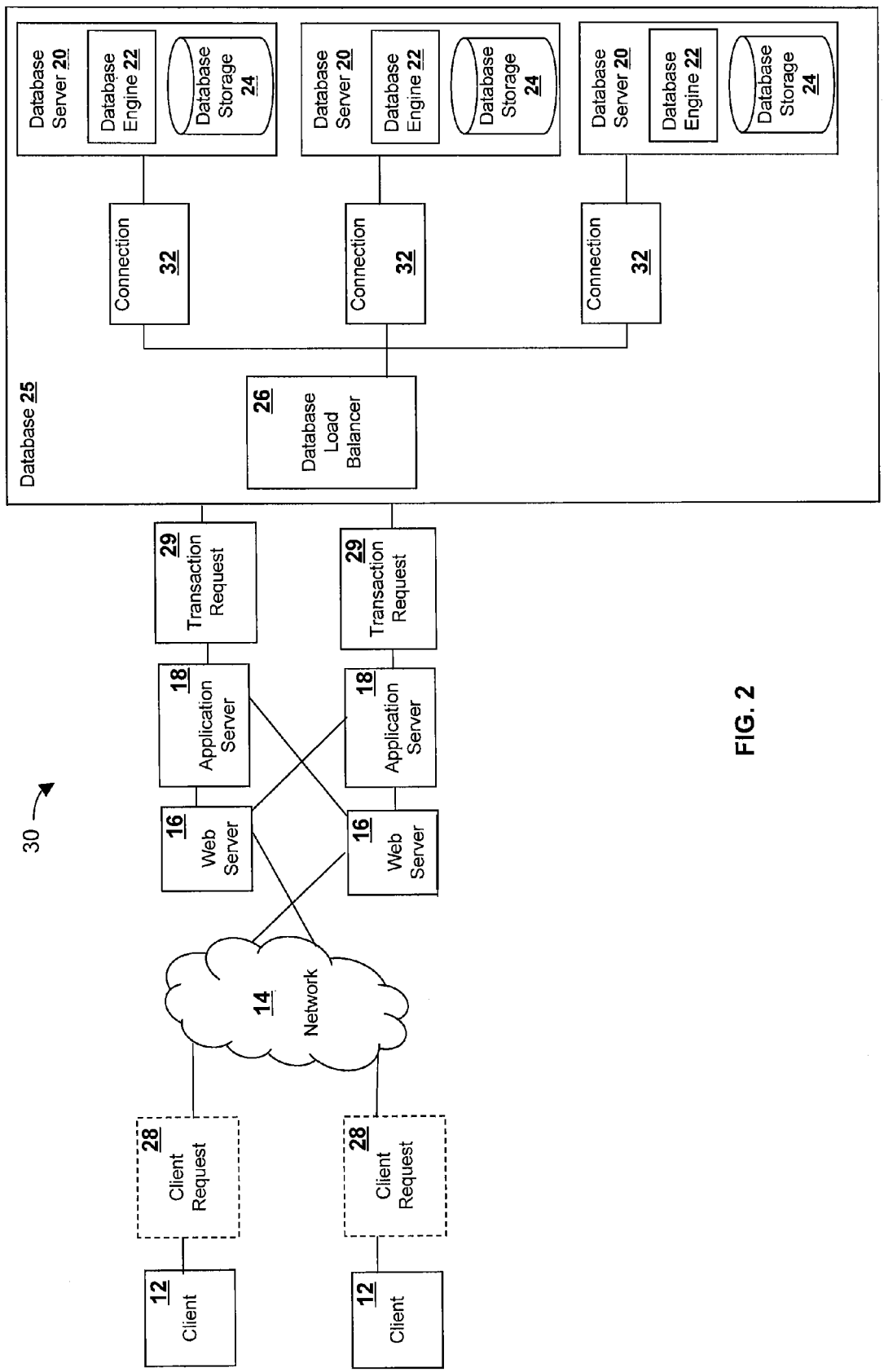
FIG. 2 is a block diagram of the components of a distributed database system.

Reference is now made to FIG. 2, where the components of an exemplary embodiment of the distributed database system 30 are shown. In FIG. 2, the distributed database system 30 is illustrated with reference to a network environment. The distributed database system 30, as is illustrated in further detail below, may be used in different environments. The distributed database system 30 may be used by one software application that stores data, or in a network setting where there is client-server interaction, or any environment where data is stored.

In the system 30, one or more clients 12 may initiate a client request 28. The client request 28 is generated based on the client's request for certain functionality or data. Client requests 28 result from most operations that are performed upon the client 12, including, but not limited to, the request to access certain data, saving a file, or to view certain files or data. The client request 28 may translate into one or more operations that access and or modify database records stored on the respective database servers 20. The client request 28 is transmitted through the network 14, to the web server 16, which transmits the client request 28 to the application server 18. The application server 18 translates the client request 28 into one or more database-specific operations that are collectively referred to in FIG. 2, as a transaction request 29. The transaction request 29 contains database operations that are to be performed upon a database 25 that is visible to the clients 12 that need to be performed to fulfill the client request 28 to the clients 12 the various database engines not visible, and the one database 25 is visible to the client. A transaction request 29 will result in one or more database operations, which may include, but are not limited to modifying option settings, read or select operations, write operations, commit operations, and rollback operations. The transaction request 29 represents a set of database operations that are being processed as part of a single database transaction. In an exemplary embodiment, the distributed database 25 is implemented across one or more database servers 20, where as described below each database server 20 comprises a storage that stores the identical records that make up the database upon the respective database storages 24. The exemplary embodiment is shown with respect to one distributed database 25 that is implemented through all of the database servers 20. In alternative embodiments, the database servers 20 may be used to implement more than one distributed database 25, that has, multiple and different collections of data records. In embodiments, wherein more than one database 25 is implemented upon the respective database servers 20, multiple database servers 20 may be used to replicate the data records for each database 25, however not all database servers 20 are required to implement all of the database instances. While the various database servers may have stored upon them database storage for more than one database each database storage for each database will contain identical records. The alternative embodiment allows for the potential improved use of resources, as each database system is implemented upon the database servers 20 that are appropriate considering the processing requirements that are required. A database load balancer 26 receives the transaction request 29. The database load balancer 26, in an exemplary embodiment, may be resident upon an independent server that receives the transaction requests 29. In alternative embodiments, the database load balancer 26 may be resident upon any one of the database servers 20 that it connects to, or any one of the application servers 18 that it receives transaction requests 29 from. In alternative embodiments, more than one database load balancer 26 may be present, where each database load balancer 26 has associated with it one or more database engines and storage servers. In such an arrangement, there would also be connections between the database load balancers for the coordination of the system. When more than one database load balancer is used, one load balancer is designated as a master load balancer. As the load balancers must agree to the sequence of execution of the operations, as described below, the master load balancer would communicate the sequencing information with the other load balancers. Each load balancer also would maintain, in an exemplary embodiment transactional logs that are described below. The database load balancer 26 is used to virtualize the plurality of database servers into one distributed database 25. The distributed database 25 contains one or more database servers 20, but appears to be one database environment to the applications/servers that are sending transaction requests 29 to the database load balancer 26. In the exemplary embodiment, the database load balancer will equally balance client transaction requests 29 across all of the database servers 20, depending on the availability of the database server 20 and its associated "busy-ness". In alternative embodiments, a client quality of service model can be introduced where each client may only access a fraction of the set of database servers 20. For example, a set of database servers 20 within the cluster may be reserved for real-time access by clients, while a different set of servers 20 may be used for report generation clients to avoid impacting the real-time performance of the first set of clients. This quality of service model would only apply to read transactions—to ensure the consistency of the database 25 all write operations would still need to be processed by all associated database servers 20 as described below.

The database load balancer 26 maintains connections 32 to the multiple database servers 20, where each database engine 22 is used to store identical data records upon the respective database storages 24. A connection 32 is opened between each database server and the database load balancer 26. The database load balancer 26, may have any number of connections 32 established between itself and the respective database servers 20.

The database load balancer 26, upon receiving a transaction request will make use of one or more database servers 20, and the respective database storage 24 associated with the server 20. The components of the database load balancer 26 are illustrated in further detail below.

The database load balancer 26 sends all transaction requests 29, and more specifically the operations that comprise the request, along with sequencing, lock and other management operations to one or more of the database servers 20. The sequencing lock, and other management operations are needed to properly maintain the consistency of database records contained in the plurality of database storages 24. There are many types of management operations that will be required to maintain the data consistency of the virtualized database 25. Management operations include, but are not limited to, requests for user connection and statement allocations, implicit configuration or option settings, recovery and roll-forward information and implicit close or rollback operations where errors or system failures are encountered.

Figure 3:
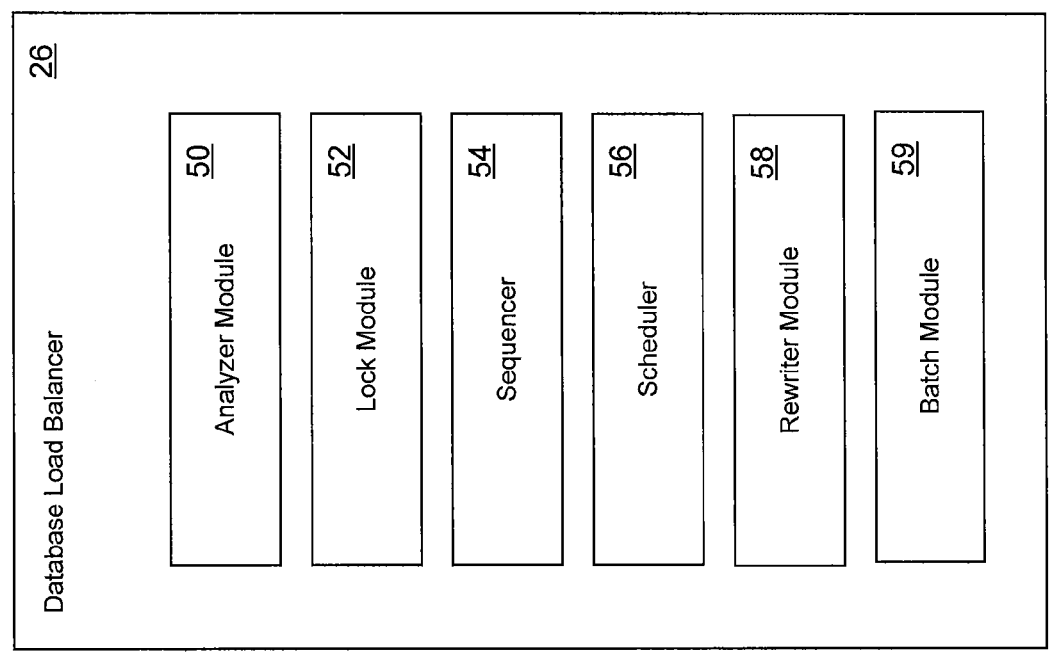
FIG. 3 is a block diagram illustrating the components of the database load balancer.

Reference is now made to FIG. 3, where the constituent components of the database load balancer 26, are shown in one exemplary embodiment. In an exemplary embodiment, the database load balancer 26 is comprised of an analyzer module 50, a lock module 52, a sequencer 54, a scheduler 56, a rewriter module 58, and a batch module 59. analyzer module 50 is used to analyze the transaction request 29 (FIG. 2). In one exemplary embodiment, the transaction request 29 (FIG. 2) as received by the analyzer module 50 is comprised of one or more SQl statements. The embodiment is described with respect to the processing of SQl statements, however, the system is capable of being used with database query languages other than SQl, or with databases that utilize procedural data processing rather than a query language. Alternative embodiments may also utilize multiple analyzer modules. The analyzer module 50 parses the SQl statement, and determines the exact read and write requests that have been made by the transaction request 29 (FIG. 2) and determines which database records are read and which database records are modified. In alternative embodiments, the analyzer module 50 may be an independent module that implements a parallel process that receives instructions from the database load balancer 26 and determines the requests that have been made by the transaction requests 29 (FIG. 2). Database records may be accessed either through direct or indirect access. Direct access occurs when the SQl statement is a direct select or update operation. Examples of indirect accesses include, but are not limited to, function and stored procedure calls (e.g. a function call will read/write a specific set of records), views or other database objects that access and consolidate database records into a new dataset, and other database relationship constructions such as foreign key constraints.

The lock module 52 determines the locks that are to be placed on a specific database record based on the transaction request 29 (FIG. 2) that is received. Database locks are used to ensure consistency of data, along with synchronization of database records, and are used to control parallel access to the database records. By implementing database locks, which define the specific operations that are permitted upon a database record, a scenario is avoided where parallel attempts are made to access and or modify a data record, which may result in inconsistent results. Therefore, database locks allow for consistency of the data that is contained within the database records of the respective database storages 24 (FIG. 2). As the database 25 (FIG. 2) uses more than one database storage 24 (FIG. 2), the database locks ensure that consistent results are obtained when writing to or reading from any of the databases storages 24 (FIG. 2). As the database records may be accessed and or modified by more than one transaction request 29 (FIG. 2), database locks ensure that concurrent access by different transaction requests is not allowed where inconsistent data would result.

The lock module 52, based on the transaction request 29, determines which database locks need to be issued. In an exemplary embodiment, there will be at least two types of database locks that are required. One type of database lock controls concurrent reading of data records, and one controls concurrent writing to data records. A read lock that is placed upon a database record ensures that as the particular database record is being read, no write operations may be performed upon the particular database record. A write lock ensures that as the database record is being written to, no read or write operations may be performed upon the particular database record. Additional locking levels may be introduced as required by the database implementation (e.g. exclusive locks) that can be at different "levels" from the read/write locks. The database locks are described in further detail below with respect to FIG. 7. In alternative embodiments, the lock module 52 may be implemented as a separate parallel process which is provided with the record information and provides the appropriate lock information.

The sequencer module 54 receives the results from the analyzer module 50, and proceeds to assign a sequence number to each of the transaction operations that will access a particular database record. Sequence numbers are assigned so that the transaction operations may be ordered when they proceed to attempt to operate upon the respective database storage 24 (FIG. 2), and more specifically upon the specific database records. As each transaction request has associated with it one or more database locks, the sequence number assigned to the transaction operations are then associated with the database locks as explained in further detail below. The database load balancer 26 may contain more than one sequencer, so long as there is a single authoritative sequence assigned for any specific database record. In alternative embodiments, the sequencer module 54 may be implemented as a separate parallel process, which receives the lock information and provides the assigned sequence numbers. The sequence module 54 may also be implemented upon a separate computing device. Where the sequencer module 54 is implemented as a centralized process, as described above, it may be associated with one database load balancer, or in alternative embodiments, one sequencer module may be associated with more than one database load balancer 26. Where a sequencer module 54 is associated with two or more database load balancers 26, the two or more database load balancers 26 can be used to provide to active backups to the other database load balancers 26. Therefore, when either database load balancer becomes unavailable for any reason, the other database load balancer 26 is able to service the requirements of the clients that are making requests to the load balancers.

The scheduler module 56 is used to track the execution of the respective transactions, and specifically the transaction operations upon the respective database records. The database load balancer 26 is shown in this exemplary embodiment, as being comprised of one scheduler module 56. In alternative embodiments, there may be more than one scheduler 56 that is associated with a database load balancer 26. The scheduler 56, first receives the operations associated with the transaction request 29 as well as the various lock and sequence operations assigned to that operation by the lock module 52 and the sequencer 54. The operations, lock and sequence operations that are received are then used to determine the distribution and processing requirements for the operation amongst the database servers 20. As described, the operations are distributed evenly across the database servers 20 according to the availability and processing capability of the servers 20 and the locking and database consistency requirements, unless the particular database 25 is on all of the database servers 20 or a quality of service configuration precludes a client from accessing all of the database servers. In an exemplary embodiment, the scheduler 56 in order to track the execution of the respective operations and transactions employs a scheduler table 60, a database server load table 62, and a log table 64. In alternative embodiments, the scheduler module may be implemented as a separate parallel process that tracks the execution of the transaction requests. In the alternative embodiments where multiple database load balancers 26 are managing a database 25, there will be multiple instances of the scheduler module 56 and multiple copies of the logs required to maintain the database consistency on each set of database servers 20 managed by each of the database load balancer 26.

The database load balancer 26, in an exemplary embodiment has associated with it a query rewriter module 58. As, the database load balancer receives client requests 28 from the various client stations, the rewriter module 58, where possible translates the client request to a transaction request 29 based on knowledge of the previous transaction requests that were issued. When a transaction request 29 is generated, in an exemplary embodiment, the elements that are associated with such a request are stored in a cache memory. In various embodiments, this cache may exist on the database load balancer 26, the database server 20 or the database engine 22 or any combination thereof. The cache memory stores various transaction requests that are commonly used. As the applications that have generated client requests 28 have done so without taking into account the nature of previous requests that have been generated, the rewriter module 58, where possible, makes use of the cache memory and its contents to generate a transaction request 29 that will optimize processing by the database server 20. As an example, where a request is received that is identical to a query that has previously been received in its result, but not in form (e.g. the query text is rearranged in such a manner that the query is identical to a previous query but the text is not identical) the rewriter module will attempt to rewrite the request as a transaction request that resembles the form of the previous request. The rewriter module 58, in an exemplary makes use of a template of transaction requests that are referred to as prepared transaction requests. These prepared transaction requests, in an exemplary embodiment, are statements that the rewriter module 58 has determined have a common query "form", with the only difference being the specific argument/values in the query. Where the database engine 22 supports the notion of the prepared statement (e.g. a query with markers to indicate value substitution) this embodiment will convert the query into a prepared form, which will allow the database engine 22 to optimize its processing.

The rewriter module 58 also analyzes the contents of the client requests 28 to determine whether any non-deterministic elements are used. When the database load balancer 26 sends requests to each of the database servers 20 and the corresponding database engines 22, it is expected that the result of processing the query at each database engine 22 will have the same result (deterministic behaviour) to ensure the consistency of the database 25. If there are non-deterministic elements in the query, this would result in the database records on each database server 20 becoming inconsistent. Examples of non-deterministic elements, include, but are not limited to a function that returns the current time or a random number. Taking a query that is putting a record into an audit table where one of the columns is being filled with the results of the "current time" function (e.g. when the audit record was generated) as an example. If this query was sent to the database servers 20 without modification, each database engine 22 would run the query at a slightly different time, resulting in an audit table on each of the database servers that is not identical to the others. Therefore, where a non-deterministic element is determined to exist by the re-writer module 58, the re-writer module 58 where possible will replace the non-deterministic element of the query with a deterministic value. In the example above, the function call for the "current time" in the query would be replaced with the actual time value (from the clock associated with database load balancer), ensuring the audit record being written to the database is the same on all of the database servers 20.

When a transaction request 28 is sent to the respective database server 20, it is analyzed by the batch module 59. The batch module 59, determines whether a set of queries as part of a single transaction request 28 that are to be sent to the database servers 20 may be sent as part of one batch (for example, a transaction request 28 that only contains a set of update operations). Where the batch module 59 determines that a set of updates can be batched and the database engine 22 supports it, the batching module 59 will combine the queries into a single batch operation as part of the transaction request which reduces the network overhead of the transaction request and optimizes the processing of the queries.

Reference is now made to FIG. 4, where the fields of the scheduler table 60 are shown in one exemplary embodiment. The scheduler table tracks the operations, the specific sequence numbers and locks and responses associated with the operations. The scheduler table 60 in one exemplary embodiment, comprises an operations field 72, a sequence number list field 74, a locks requested list field 76, and a response field 78. The scheduling table 60 is illustrated with respect to one embodiment. A record is created and entered into the scheduler table 60 for each operation received by the load balancer as part of the transaction request 29 sent from the application server 18. The operations field 72, records the operations that are part of the transaction. The sequence number list field 74, specifies the set of sequence numbers that have been assigned to the respective operation by the sequencer 54. For one operation, a list of sequence numbers and locks may be assigned. For example, the following operation:

Read from Record A, Record B, Record C has three sequence numbers assigned as three different database records (record A, record B, and record C) are accessed. The locks requested list field 76, specifies the database locks that are associated with this particular transaction, and more specifically that are associated with the operation. As mentioned above, more than one lock may be associated with a particular operation as the operation may utilize multiple database records. The structure of the database locks is described in further detail below with respect to FIG. 7. The response field 78 records the results of the execution of the respective operation at the one or more databases. In an exemplary embodiment, the contents of the response field are primarily the success/fail response codes from each of the distributed database engines 22 based on the attempt to perform the requested operation at the respective database storage 24. The response field 78 may also include other details used by the scheduler to analyze the database responses and verify the consistency of the responses. Such other details contained in the response field may include, but are not limited to, the record update counts, the warnings or other status information, or parameter return information.

While some of the specific fields in the operations table 60 may be discarded once they are sent to the respective database servers 20, an operation record will persist in this table until the associated operation is considered to be complete and committed or rolled back. Operations that involve the use of a write operation are sent to all the respective database servers 20 by the database load balancer 26. Therefore, transaction operations involving a write request, are recorded in the table 60, and are not considered complete until all the write operations have executed upon all the respective database servers 20, and more specifically upon the database storages 24, and a response is received from each. In an exemplary embodiment, the database 25, may operate in two general modes, an autocommit mode, and a non-autocommit mode. In the autocommit mode, the operations that are executed upon the respective database storages 24 are final and may not be reversed. In non-autocommit mode, the operations that are sent to the respective database storages 24 for execution, may be finalized (through a subsequent commit operation) or rolled back such that it is as if they did not occur (through a roll back operation). In autocommit mode, the transaction request 29 can only contain a single operation, while in non-autocommit mode, the transaction request 29 will contain multiple operations. When the database 25 is in autocommit mode, the record associated with the write operation is deleted upon completion (processed on all database servers 20) as it is automatically finalized. When the database 25 is not in autocommit mode, the operation record will persist in the table (even once completed on all database servers 20) until the transaction request 29 is completed. Once a transaction commit or rollback occurs, the transaction request 29 is considered to be complete and all of the associated operation records will be removed from the table. The database load balancer 26 only sends read operations to one of the database servers 20 (based on load factors associated with the respective servers as described below, the distribution of the database records on the servers and the quality of service agreements). When the database 25 is in autocommit mode, the read record would also be deleted upon completion. In a non-autocommit mode, the read records would be retained until a transaction commit or rollback occurs as the associated locks are still held by the transaction. In addition, in non-autocommit mode, the scheduler would also send a 'virtual-read' to the other database engines not performing the read. In the exemplary embodiment, this 'virtual-read' contains all of the lock and sequence information associated with the read operation but not the actual query. This permits the database servers 20 which are not performing the read to establish the read locks and maintain the associated scheduling information to remain consistent with the database servers 20 actually performing the read. Where the database 25 is operating in non-autocommit mode, when a commit or rollback operation is received by the database load balancer 26 all of the operation records held as part of the transaction would then be deleted.

When a read operation is made as part of a transaction request 29, the database load balancer 26 sends the read operation to only one database server 20. There are numerous mechanisms by which the database load balancer 26 can determine which of the database servers 20 should receive the request. In one exemplary embodiment, the load balancer 26 can use the scheduler table 60 to determine the current status of all of the database servers 20. The load balancer 26 by analyzing the scheduler table 60 may select the database server that is most "up-to-date" with respect to the database records of interest (for example which server has the least number of outstanding requests for the database records). In another exemplary embodiment, the database server 20 could be determined based on the current load of the database servers 20, as described below. In each case, the objective is to determine the database server 20 that is best suited to process the read request as soon as possible. Other algorithms may be used to determine the database server 20 best suited to process the read operation, including, but not limited to the use of a "round-robin" distribution of requests, the use of query analysis to optimize the server selection, and the use of an adaptive/learning engine to perform the selection or any combination of the above.

Reference is now made to FIG. 5, where the fields of the database server load table 62 are shown in one exemplary embodiment. In one exemplary embodiment, the database server load table 62 is comprised of a database server field 80, and a load field 82. A record will be entered and updated in the database server load table 62, when a response is received from a database server. The respective database server 20 that transmits a response based on the operation performed at the database storage 24, includes with the response, information pertaining to the load that remains to be processed at each database. The term load is used to refer to the processing ability of the respective database storage 20 which may be dependent upon any one of a number of factors, including, but not limited to the operations remaining to be performed, the processing speed of the server 20, and other measures that may be used to determine the load upon a database server 20. In an exemplary embodiment, when processing a read request, the scheduler 56 consults the database load table 62 to determine which database server 20 the read request should be sent to. This ensures that a database server 20 with the lowest load receives the read request. In alternative embodiments of the database server load table 62, the load associated with each database server 20 may be determined based on selective updates (where load information is passed only with certain classes of requests), periodic updates (where load information is returned on every n-th response or a response at every n-th time) or asynchronously, where a separate process is used to update the database load values according to a defined schedule. In an alternative embodiment, the load field 82 stores the number of requests still pending on the database engine in question.

Reference is now made to FIG. 6A, where the fields of the log table 64 are shown in an exemplary embodiment. The log table 64, in an exemplary embodiment, comprises a connection field 90, an operations field 92 and a status field 93. The connection field 90 indicates the database server 20 to which the database load balancer 26 has sent an operation to for execution. The operation field 92 specifies the operations that have been sent to the respective database server 20. The status field 93 indicates the response received from the database server 20 in response to the execution of the operation. The log table 64 is updated continuously, so provides an accurate record of all the operations that have been transmitted through the database load balancer 26. This log table 64 may exist only in memory on the database load balancer 26 but will, in most cases, also be stored on a physical storage device for persistence. In this way, should there be a restart of the processes associated with the database load balancer 26, the persistent log table stored on the physical device can be used to reconstruct the log information. There may also be multiple copies of the log table 64 to maintain availability and consistency in the event of a complete load balancer 26 failure. Also, as described earlier, where there are multiple load balancers 26 managing the same copy of the database 25, there exist multiple copies of the log table 64, where in an exemplary embodiment one log table 64 is associated with each load balancer. Where multiple load balancers 26 are employed, the respective log tables 64 are maintained in a consistent manner. This log table 64 is used whenever a database server 20 needs to be updated as it may have been offline. A database server 20 may have been offline for a variety of reasons, including but not limited to, a power failure, or a faulty network connection. When the database server 20 comes back to an online state, it is necessary for it execute all the operations that were not possible when it was offline. As a result, the log table 64 is used to transmit operations that are necessary to ensure consistency of data to database servers 20 that have come back online. By executing the operations sent from the log table 64, the database server 20 that has come back online then contains an identical data storage 24 to all the other database servers 20 and their respective database storages 24.

Reference is now made to FIG. 6B, where an alternative embodiment of a log table 64 is shown. In an alternative embodiment, a numerical identifier field known as the transaction identifier 94 replaces the connection field 90 in the log table 64. The transaction identifier 94 is used to identify the transaction request 29. Each transaction request has associated with it, a unique transaction identifier 94. The transaction identifiers 94 is transmitted to the database server 20, along with the sequence, lock, and operation information for each operation that is part of a transaction request 29. Reference is now made to FIG. 6C, where the fields of a transaction table 66 are shown. The transaction table 66 is resident upon, or accessible to, and managed by a database engine 22. The transaction table 66 is used when the log table 64 as shown in FIG. 6B is used. The transaction table 66, in an exemplary embodiment is comprised of two fields, a session ID field 96, and a transaction identifier field 98. The transaction table 66, for each session, stores the last transaction that was committed upon the database server 20. When the database engine 22 commits a transaction, the transaction identifier field 98 stored in the transaction table 66 is also committed and hence symbolizes that the respective transaction has been committed. If a connection failure or a system outage occurs which causes the transaction to be rolled back by the database engine 22, the transaction identifier field 98 in the transaction table 66 is also rolled back, so that the last committed identifier value is restored. As a result, the commit status of the operations of the log table 64 are known for each respective database server 20. Therefore, in the event that a database server 20 goes offline, and then returns to an online state, the database load balancer 26 is able to query the respective database server 20, to determine the last committed operation that took place upon its respective database storage 24 by reading the contents of the transaction table 66. As a result, operations that should have been committed are sent to the respective database server, so that any operations that need to be executed at the database server 20 to ensure consistency of database records are executed. By executing the missing operations (missing as the server was offline or otherwise not functioning) sent from the log table 64, the database server 20 that has returned to an online state contains an identical data storage 24 to all the other database storages 24 stored on their respective database servers 20. Note that the server could go offline due to a physical problem with the database server 20 (power/hardware), a failure of the database engine 22 or the database storage 24, or in the event that an inconsistent response was received by the database load balancer 26 where the database load balancer itself was responsible for taking the database server offline. In any of these events, assuming that the database records stored in the database storage 24 have not been corrupted, the database can be restored to the online state. In alternative embodiments, the log table may be stored and implemented upon a separate database engine on the load balancer 26.

The respective tables that have been discussed above, including the scheduler table 60, the database server load table 62, and the log table 64 may all be used if any database storage 24 requires reconstruction. As discussed above, the database storage 24 may be reconstructed as a result of it having been unavailable for any reason, or where the administrator wishes to reconstruct a database storage 24 at any point in time of the database storage's existence. This allows, if necessary for a database storage 24 to be reconstructed to determine its state at any point in time, and also for the database storage to be reconstructed where one or more query instances need to be removed. Entries may be removed where the administrator may desire to remove an errant entry in the database (for example, the accidental deletion of a database table).

The log table as described above may be used to reconstruct a database storage 24 at any instance of time. The log table 64 may be used to remove entries in the database storage 24 that have been made in error, and then reconstruct the database storage 24 accordingly. In an exemplary embodiment, the database load balancer highlights certain operations as ones that may have potentially been made in error. Specifically, any operations that may be requested to be undone (the addition or deletion of data), or provide difficult to undo (i.e. removing a table from a database), may have the effects of the operation stored in a temporary state.

The database load balancer 26 depending on the transaction request, and the operations requested, may cause a portion of the data record on the database storage to be hidden. Where it is determined that an operation may have been requested in error, and where reversing the operations are processor intensive, data records may be hidden in response to certain operations. Where data records are hidden, they are not deleted but rather renamed in the event that if the operation is reversed the data record may be restored by assigning it the name originally associated with it. As an example, where a table is requested to be deleted, the query may be modified to rename the table when the user is not likely to the user is not likely to use is not likely to use the rewritten name. If it is then determined that such an operation is to be reversed then the original name is restored. If it is determined that the deleted table operation was not requested in error, then after an elapsed number of operations the table may be deleted.

The log table 64 as has been described here may be used to reconstruct a database storage 24 when the database storage 24 has become unavailable, or where an error has been made, and one or more operations are reversed, and the database storage 24 then reconstructed. This requires the entire set of operations to be recomputed upon the respective database storage 24 if a change is to be made. The database load balancer in an exemplary embodiment may designate one database storage 24 as a delayed storage. The delayed storage 24 may not be used to perform read queries as the delayed storage does not store the most current data, as not all of the operations have been executed upon the respective storage 24. As the execution of various operations upon the delayed storage 24 lags behind that of the other storages 24, the database load balancer 26 is able to filter an errant operation such that it does not execute upon the delayed storage 24. The remaining operates may then be executed upon the delayed storage 24, and the other database storages 24 may then replicate the delayed storage 24, instead of having to rebuild the other database storages as a result of the errant operation. An errant operation may be any operation that is then reversed.

Figure 7:
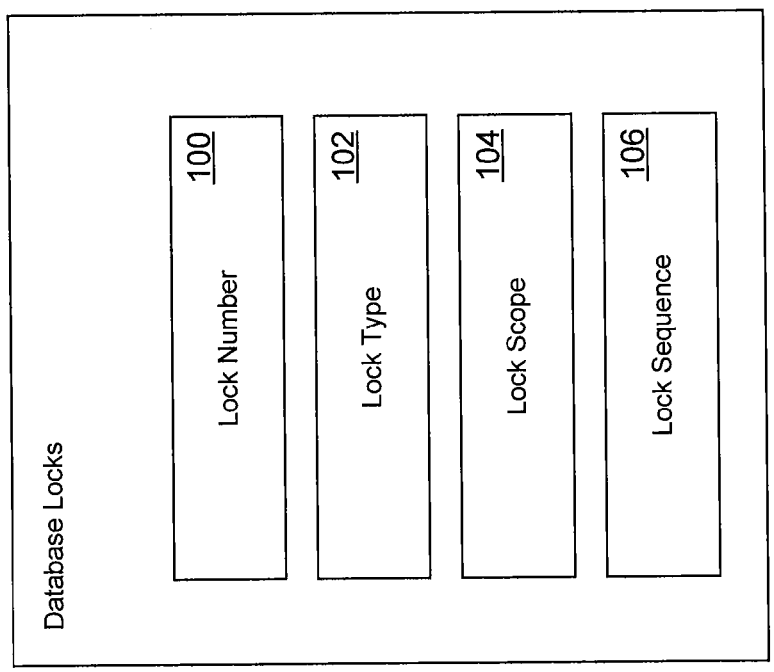
FIG. 7 is a block diagram of the components of database locks.

Reference is now made to FIG. 7, where database locks are illustrated in further detail. In an exemplary embodiment, each database lock has associated with it a lock number 100, a lock type 102, a lock scope 104, and a lock sequence 106. The lock number 100 is used as a unique identifier that identifies the particular lock, and associates the lock with the particular database record. The lock type signifies whether the lock is a read or write lock. The lock scope 104 specifies how long the lock is to remain in place for. The lock scope 104 may either be of a transactional scope or an operational scope. In the transactional scope a lock is placed upon a database record that is only removed when all the operations that comprise the transaction have executed. In the operational scope, the lock is in place only as long as is necessary for a specific operation to be completed. The lock sequence 106 is the sequence number associated with the lock as part of the transaction.

The database load balancer 26, when it receives a request will determine the various locking requirements as discussed above. However, the load balancer 26 can also support instances where database locks are not required. This would be a manually configured situation where a particular client does not have a need for absolutely consistent data, for example, a system that is doing value estimation where minor inconsistencies are not significant. In the situation where a client has indicated such a tolerance for inconsistent data, the database load balancer 26 can skip the parsing, sequencing and locking operations and immediately forward the request to the database engine 22. In this way, the read requests can be processed as quickly as possible and the database load balancer 26 is behaving as a traditional stateless load balancer.

Figure 8:
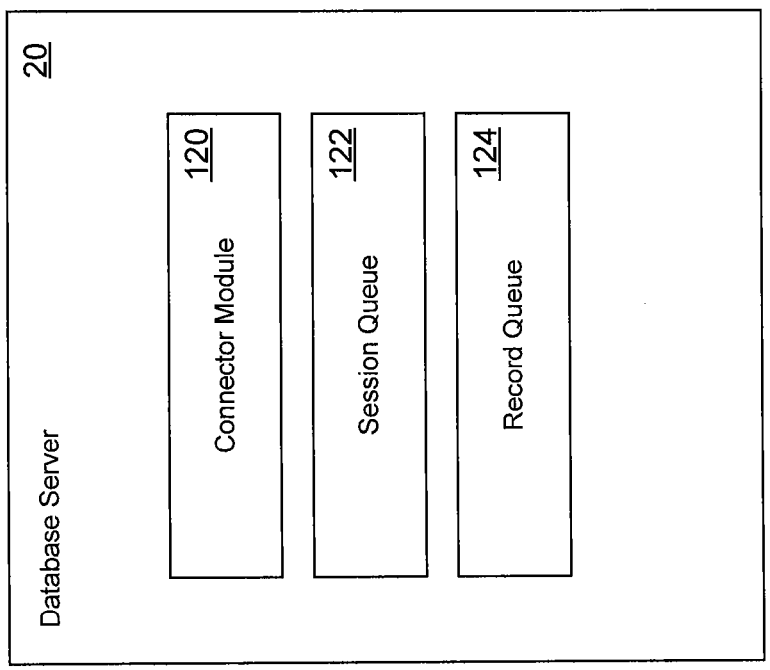
FIG. 8 is a block diagram of the components of a database server.

Reference is now made to FIG. 8, where the components of an exemplary embodiment of the database server 20 are shown. The components contained in this exemplary embodiment are found on all database servers 20 that are part of the database 25. Each database server 20 has resident upon it, or accessible to it, a connector module 120, a session queue 122, and a record queue 124. A record queue 124 exists for each database record that is resident upon the database storage 24. A session queue 122 exists for each unique session established between the application server 18 and the database server 20. While any particular transaction request 29 will be completely processed through a single session, there may be multiple sessions attached to the database server 20. For example, each session may correspond to a different user login on the client 12. The connector module 120 receives the operation request sent from the database load balancer 26 along with the database locks and sequence numbers that are associated with the operation. The connector module 120 proceeds to place all of the operation requests and the associated locks in the corresponding session queue 122, as well each of the record queues for the database records being accessed by the particular operation. In an exemplary embodiment, the connector module 120, session queue 122 and record queues 124 are stored upon the respective database engines 20. In alternative embodiments, the respective connector modules 120 and respective queues associated with each database server 20, may be stored upon the database load balancer 26.

Upon the completion of a specific operation at the respective database server 20, the database server 20 returns the result of the operations. The results may include, but are not limited to, a success/failure status code, statistical information (e.g. the number of rows updated), and complex result information (in the instance of a read operation). Upon the response being returned to the database load balancer 26, the next operation that is to be processed in the session queue 122 depending on the sequence number assigned, may be executed. Upon receipt of the response from the database, the database load balancer 26 needs to respond to the application server 18 that had requested the operation. In one exemplary embodiment, if one response to a write operation has been returned, as the same write operations are sent to all of the databases, the database load balancer 26 proceeds to respond to the application server upon receipt of this first response. In alternative embodiments, the database load balancer 26 may return a response to a write operation at different times. For example, the load balancer 26 may wait for all writes to complete to ensure a consistent result (through a voting model), wait for the first successful write to return (assuming the errors are inconsistent cases), or use a more complex algorithm to ascertain the expected write status based on the responses from the database servers 20 and respond once the result is definitively known. For a read operation, the request was only sent to one database server 20, so the database load balancer 26 can immediately respond to the application server 18. In an exemplary embodiment, the database load balancer 26 can also capture a read error that is not due to an invalid query (e.g. a network failure) and resend the read request to another database server 20.

Figure 9:
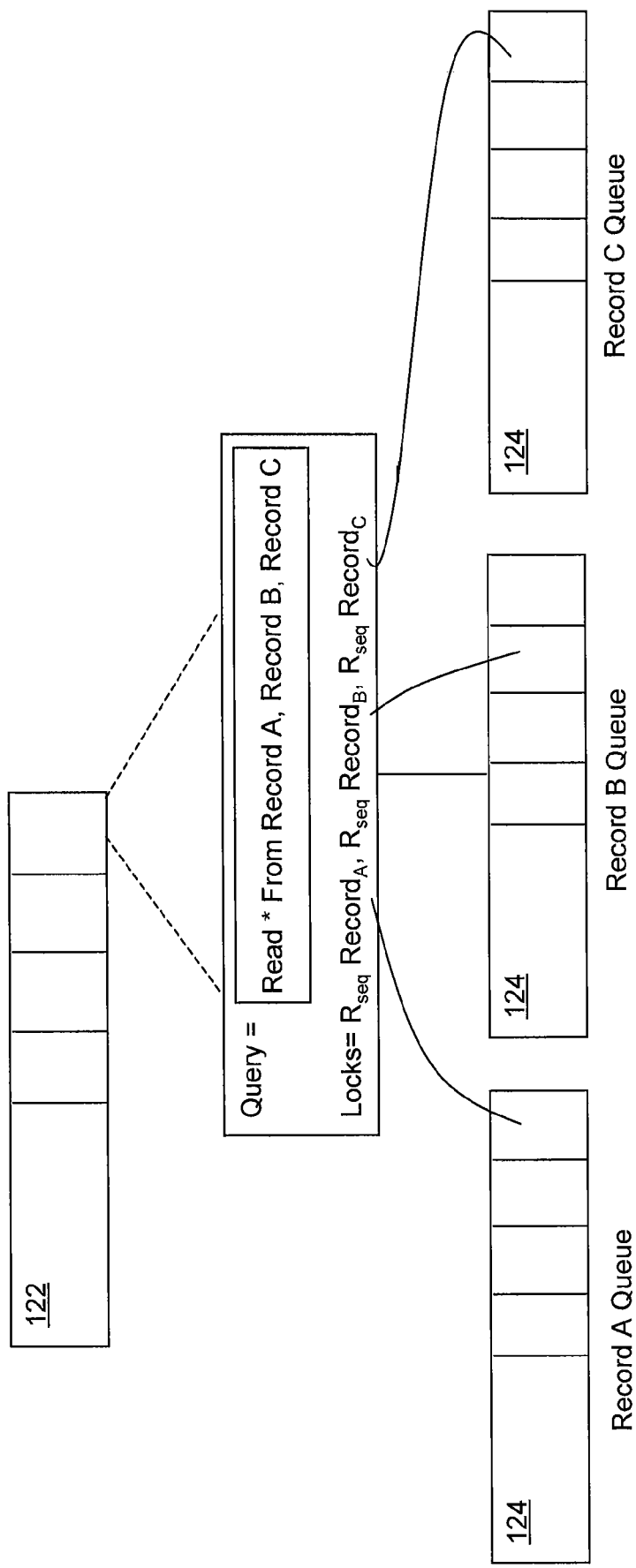
FIG. 9 is a block diagram illustrating the user queues and record queues.

Reference is now made to FIG. 9, where a figure illustrating session queues 122 and record queues 124 is shown. FIG. 9 illustrates that a specific operation has been transmitted to the database server 20, and is resident in the session queue 122 for execution. The operation query has been provided for example, and is:

Read from Record A, Record B, Record C

This operation therefore comprises a single read operation that must be completed upon three database records A, B, and C, respectively. The query has been transmitted along with the specific sequence numbers and locks that are necessary to execute the particular query. With respect to this example query, three database record read accesses are required, and are illustrated in FIG. 9 as $R_{seq}$ RecordA, $R_{seq}$ RecordB, and $R_{seq}$ RecordC.

The R indicates that the operation is a read operation, and the seq identifier is used to identify the sequence number associated with the operation. The operation record for the query is then placed in the respective record queues 124 associated with each accessed record. The operation is placed in the queues 124 based on the sequence number associated with the query, in order of sequence where the operation with the lowest sequence number is the first in the queue. As is explained in detail below, it is possible for an operation to arrive at the connector module and be inserted into the middle of the respective queue, based on the sequence number. This will take place when the locks associated with the respective operation are escalated as is described below. In the exemplary embodiment, the operation can be executed once the operation entries in all of the associated queues (e.g. the session queue as well as all of the record queues) are at the "head" of the respective queues. The notion of the "head" of the queue depends on the queue type. For the session queue 122, the operation is at the "head" of the queue when it is the first record—in this manner, requests that have been generated by a particular session (a single "user") always occur in order. For the record queues 124, the record is at the head of the queue when there are no other records of a higher lock level or a lower sequence number ahead of it. For example, if the first two records have a write lock and then a read lock for the same sequence number, the read cannot proceed because the write has a higher lock level. Likewise, if there are two writes with different sequence numbers, the latter cannot proceed until the first has completed (lower sequence number). However, if there are two read operations at the front of the queue with the same sequence number, either can proceed (the second can pass the first) as they are considered equivalent or the two read operations can be processed concurrently.

The method by which the sequence number and scope are associated with locks is now described. In an exemplary embodiment, the sequence numbers and scope depend partly on the transaction isolation level. Transaction isolation levels allow for control over the degree of access to the database records. The transaction isolation levels, in an exemplary embodiment, are described with respect to ANSI SQL. However, it should be understood by one skilled in the art, that transaction isolation levels vary depending on the particular query languages being employed in the system 30. The transaction isolation levels are a property of the transaction request 29. The isolation levels are specified ultimately by the requesting application/server, as the requesting application server determine what type of locking levels are to be in place. For example, in banking operations, the most stringent isolation level will generally be requested, whereas for other applications a less stringent isolation level is desired. When higher isolation levels are used, the performance of the system is reduced, due to the increased contention for the database records.

In ANSI SQL, there are four transaction isolation levels, read uncommitted, read committed, repeatable read, and serializable. The read uncommitted isolation level is the lowest isolation level and may also be referred to as a "dirty read", as it may read database records that have not been committed and may be rolled back. In the read uncommitted level, if the operation is part of a transaction that does not modify (write to) any database records, then no database read locks are issued. If the operation is part of a transaction that may modify any database records, then database read locks are issued, and sent to all the databases that are part of the system. At all the transaction isolation levels, any write locks that need to be issued are issued as transaction scope write locks and are sent to all the respective databases.

The read committed isolation is typically the default transaction isolation level. The read committed isolation level only reads data records that have been defined in the respective database storage 24 and that have been committed to. The read committed isolation level ensures that data records that have been modified, but where the changes have not been committed, will not be read. The repeatable read isolation level results in locks being assigned to all data records that may be modified and/or accessed within a transaction. The serializable isolation level is generally the most restrictive isolation level, as when in use it prevents a phenomenon known as "phantom values" from occurring in the data set.

Figure 10:
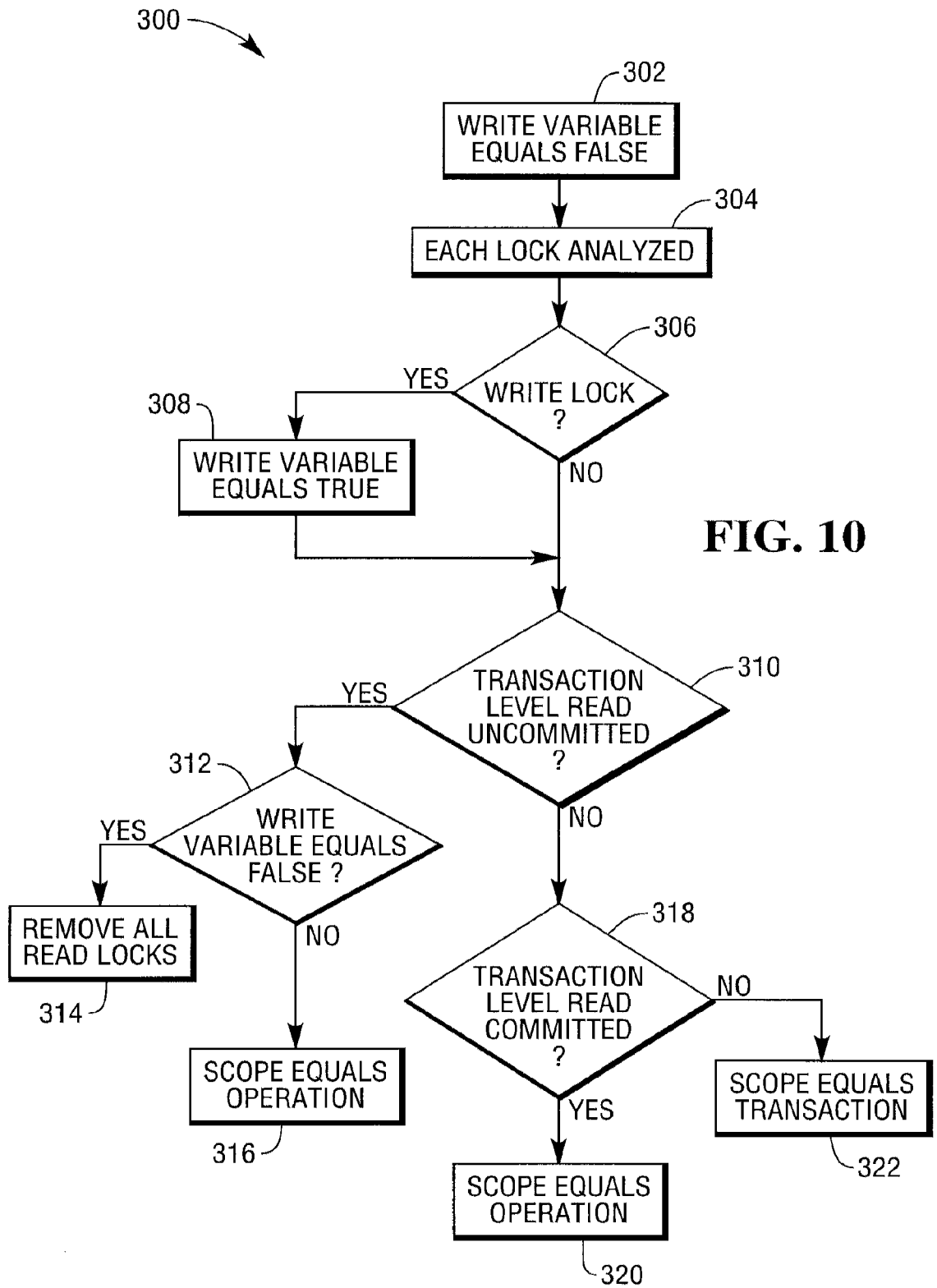
FIG. 10 is a flowchart illustrating the steps of a lock scope assignment method.

Reference is now made to FIG. 10, where the steps of the lock scope definition method 300 are shown. The lock scope definition method 300 defines the scope of all the read locks and all the write locks for a particular operation within a transaction request 29. The read locks as mentioned above, in an exemplary embodiment, may either have a transaction scope or an operation scope. At the start of method 300, all the write locks that are part of the operation are assigned a transaction level scope, as it is necessary for all the write locks to be in place for the duration of the execution of all the operations that make up the transaction. Method 300 is undertaken for each operation that is to be carried out upon one or more of the respective databases storages 24, and as received by the database load balancer 26. Method 300 begins at step 302, where a variable is assigned to keep track of whether in an operation any write locks are required. The variable is initially assigned the value false. Method 300 then proceeds to step 304, where each lock that is part of the operation is analyzed. Method 300 then proceeds to step 306, where a check is performed to determine whether each lock that is part of the operation is a write lock. If a write lock is found, method 300 proceeds to step 308, where the variable is assigned the value true. Upon the variable being assigned the value true at step 308, or where no locks remain to be analyzed, method 300 proceeds to step 310. At step 310, a check is performed to determine what the transaction isolation level is. If the transaction isolation level is read uncommitted, method 300 proceeds to step 312. At step 312, a check is performed to determine whether the variable that keeps track of whether any write operations exist in the operation is false. If at step 312, it is determined that the variable is set to false, method 300 proceeds to step 314. At step 314, all the read locks are removed from the operation. In order to remove all the read locks, method 300 has determined that the transaction isolation level is read uncommitted and that that the operation does not modify any database records. If the transaction isolation level is read uncommitted, and the step 312 returns the value true, method 300 proceeds to step 316. At step 316, all read locks that are part of the operation are assigned an operation scope.

If at step 310, the isolation level is not read uncommitted, method 300 proceeds to step 318, where a check is performed to determine whether the transaction isolation level is read committed. If at step 318, it is determined that the read lock scope is read committed, method 300 proceeds to step 320. At step 320, the read locks that are part of the operation are assigned the operation scope. If at step 318, it is determined that the transaction isolation level is not read committed, method 300 proceeds to step 322. Method 300 proceeds to step 322 where the transaction isolation level is either set to repeatable read or serializable. At step 322, the transaction scope for all the read locks are assigned as transaction scope.

Figure 11:
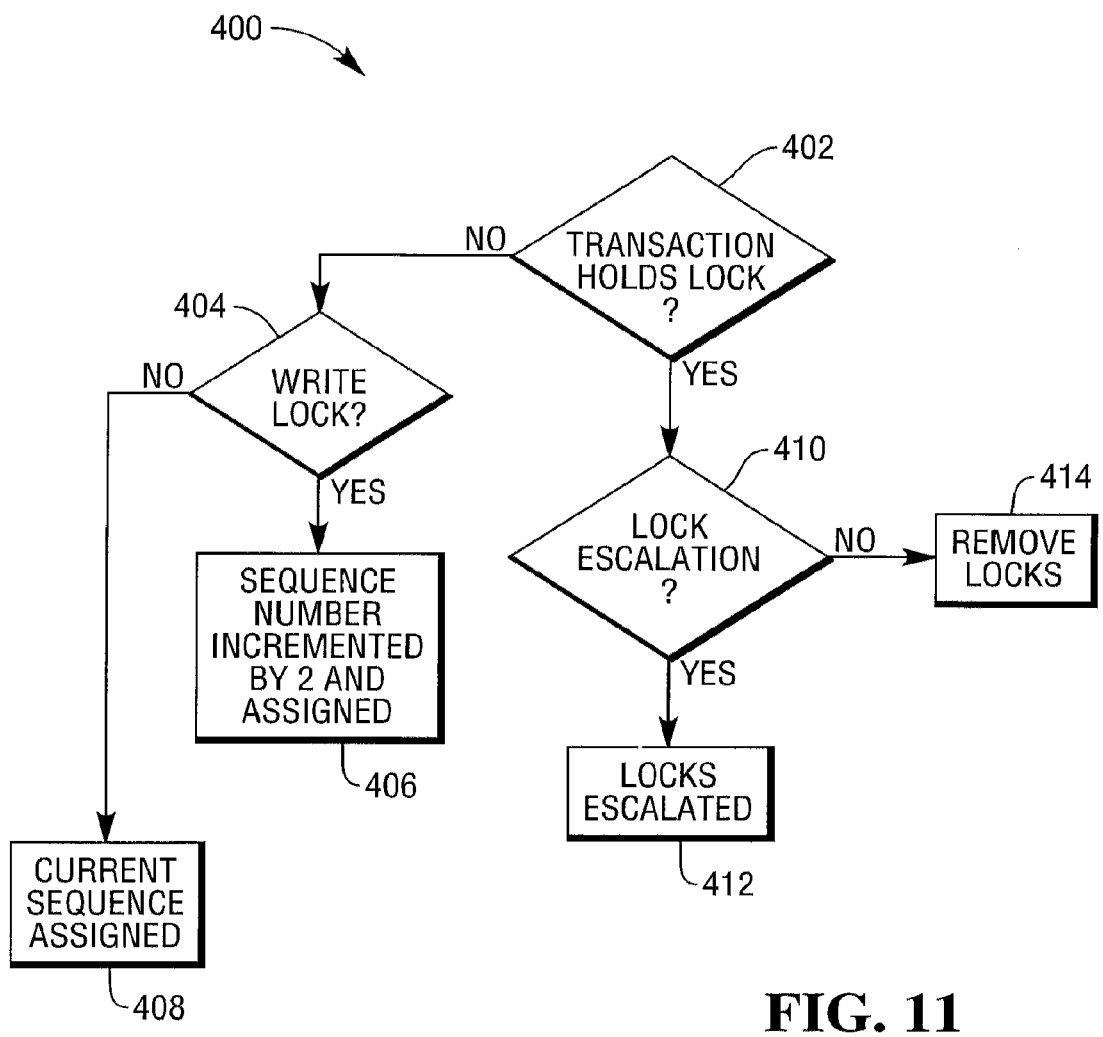
FIG. 11 is a flowchart illustrating the steps of a sequence number assignment method.

At the conclusion of method 300, all the read locks that are part of an operation had have a scope assigned, and it is then necessary to determine the sequence numbers associated with the specific locks that make up the operation. Reference is now made to FIG. 11, where the steps of a sequence number assignment method 400 are shown. The steps of the sequence number assignment method 400 are carried out for each lock that is part of an operation. Method 400 begins at step 402, where a check is performed to determine whether the current transaction already holds a lock for the database record in question. If at step 400, it is determined that the transaction does not hold this lock, method 400 proceeds to step 404. At step 404, a check is performed to determine whether the requested lock is a write lock. If the requested lock is a write lock, method 400 proceeds to step 406. At step the sequence number associated to the database record in question is incremented by 2 and the requested write lock is granted with the new sequence number. If at step 404, it is determined that the requested lock is a read lock, method 400 proceeds to step 408, and the requested read lock is granted with the current sequence number of the database record. When the sequence number associated with a new write is incremented by two from the last sequence number that was assigned for the database record, this allows for an existing read lock already assigned to this database record (from another transaction) to be escalated into a write lock as described below without having a conflict in the system. In the exemplary embodiment, as only read and write locks have been described; the increment of two corresponds to the use of only two types of locks. In alternative embodiments, where additional lock levels are supported, other sequence number increment schemes may be employed.

If at step 402, it is determined that the transaction already holds a lock for the database record in question, method 400 proceeds to step 410. At step 410, a check is performed to determine where a lock escalation is required. At step 410, the lock escalation check is performed by determining first whether the requested lock is a write lock, and then determining whether the current transaction has a read lock for the same database record as the requested write lock. If step 410 determines that the current transaction holds a read lock for the same database record as the requested write lock that is being analyzed, then method 400 proceeds to step 412. At step 412, the read lock is essentially changed to be a write lock through a process that is described here as escalation.

If at step 412, it has been determined that a lock escalation is to take place for a requested write lock, consideration must be made for a potential deadlock in the system. If no other transaction currently has a write lock for the database record in question, the sequence number for that database record is incremented by one (read to write) and the write lock is granted with the new sequence number. If another transaction has a write lock with a sequence number two greater than the sequence number of the read lock currently held by the transaction, the other write lock is a non-conflicting request (e.g. not a concurrent escalation) that allows for the escalation. In this case, the sequence number of the database record is left unchanged (it has already incremented by two) but the requested write lock is granted with a sequence number of the existing read lock plus one, and the existing read lock is dropped. Finally, if another transaction already has a write lock with sequence number one greater than the sequence number of the read lock currently held by the transaction, there is a conflict. This would arise where two separate transactions acquired a read lock for a database record, one escalated (sequence number incremented by one) and then the other attempted to escalate as well (lock conflict). In this situation, a deadlock is considered to have occurred and the transaction that is requesting the write lock is aborted, the operations within that transaction are rolled back and all of the locks associated with that transaction are dropped. If it is determined at step 410, that no escalation is required, method 400 proceeds to step 414. At step 414 the requested locks that are currently being processed by method 400 are removed, as the transaction already holds the same locks. Upon the conclusion of method 400 which is undertaken for all locks that are part of a transaction, the transactions which are comprised of the operations, and the respective locks are sent to the respective database servers as has been described above.

The present invention has been described with regard to preferred embodiments. However, it will be obvious to persons skilled in the art that a number of variants and modifications can be made without departing from the scope of the invention as described herein.

The invention claimed is:

1. A method of processing a database transaction request, the method comprising:
   (a) receiving the transaction request, wherein the transaction request is comprised of one or more operations;
   (b) analyzing the transaction request to determine the one or more operations;
   (c) associating one or more database locks with each of the one or more operations;
   (d) determining one or more sequence numbers for one or more of the database locks associated with each of the one or more operations; and
   (e) transmitting the one or more operations with the associated database locks and the one or more sequence numbers to one or more database servers accessible to a database load balancer based on respective processing abilities associated with each of the one or more database servers.

2. The method of claim 1, wherein the one or more operations are selected from the group consisting of: modifying option settings, read operations, select operations, write operations, commit operations, roll back operations, execute operations, and prepare operations.

3. The method of claim 1, wherein the one or more database servers implement one or more distributed databases.

4. The method of claim 1, wherein components of the database load balancer are distributed across one or more of the database servers.

5. The method of claim 1, wherein management operations are provided along with the one or more operations, the one or more sequence numbers and the one or more locks.

6. The method of claim 5, wherein the management operations are selected from the group consisting of: requests for user connections, statement allocations, option settings, recovery information, roll-forward information, implicit commit, and roll back operations.

7. The method of claim 1, wherein each of the one or more locks has associated with it lock number, a lock type, a lock scope and a lock sequence.

8. The method of claim 7, further comprising determining a transaction isolation level associated with the transaction request.

9. The method of claim 8, wherein each lock scope is based on the transaction isolation level.

10. The method of claim 9, wherein the lock scope is further based on the lock type.

11. A non-transitory computer-readable medium upon which a plurality of instructions are stored, the instructions for performing:
   (a) receiving a transaction request, wherein the transaction request is comprised of one or more operations;
   (b) analyzing the transaction request to determine the one or more operations;
   (c) associating one or more database locks with each of the one or more operations;
   (d) determining one or more sequence numbers for one or more of the database locks associated with each of the one or more operations; and
   (e) transmitting the one or more operations with the associated database locks and the one or more sequence numbers to one or more database servers accessible to a database load balancer based on respective processing abilities associated with each of the one or more database servers.

12. A method of processing a transaction request, the method comprising:
   (a) receiving at a database server one or more operations of a transaction request from a database load balancer based on processing abilities associated with the database server, where the operations have associated with them one or more sequence numbers and one or more locks;
   (b) analyzing the one or more sequence numbers;
   (c) placing each of the one or more operations in one or more queues based on results of analyzing the one or more sequence numbers; and
   (d) analyzing the queues to determine an order of execution of the one or more operations based on the one or more sequence numbers and one or more locks associated with the one or more operations.

13. The method of claim 12, wherein each of the one or more locks has associated with it lock number, a lock type, a lock scope and a lock sequence.

14. The method of claim 12, wherein a session queue is created for each session established with the database server.

15. The method of claim 14, wherein the session queue is resident upon the database server.

16. The method of claim 14, wherein the session queue is resident upon the database load balancer.

17. The method of claim 12, wherein the one or more queues comprise a record queue that is resident upon the database server.

18. The method of claim 12, wherein the one or more queues comprise a record queue that is resident upon the database load balancer.

19. A non-transitory computer-readable medium upon which a plurality of instructions are stored, the instructions for performing:
   (a) receiving at a database server one or more operations of a transaction request from a database load balancer based on processing abilities associated with the database server, where the operations have associated with them one or more sequence numbers and one or more locks;
   (b) analyzing the one or more sequence numbers;
   (c) placing each of the one or more operations in one or more queues based on results of analyzing the one or more sequence numbers; and
   (d) analyzing the queues to determine an order of execution of the one or more operations based on the one or more sequence numbers and one or more locks associated with the one or more operations.

20. A method of processing a transaction request, the method comprising:
   (a) receiving the transaction request, wherein the transaction request is comprised of one or more operations;
   (b) analyzing the transaction request to determine the one or more operations;
   (c) associating one or more database locks with each of the one or more operations;
   (d) determining one or more sequence numbers for one or more of the database locks associated with each of the one or more operations;
   (e) determining processing abilities associated with one or more database servers associated with a database load balancer; and
   (f) transmitting one or more of the operations with the associated database locks and the sequence numbers to a one of the database servers based on the determination of processing abilities from step e.

21. The method of claim 20, wherein the one or more database servers implement one or more distributed databases.

22. The method of claim 20, wherein components of the database load balancer are distributed across one or more of the database servers.

23. The method of claim 20, wherein one of the processing abilities is availability of each of the one or more database servers.

24. The method of claim 20, wherein one of the processing abilities is processing capability of each of the one or more database servers.

25. The method of claim 20, further comprising analyzing a scheduler table to determine status and response time of one or more database servers that are accessible to the database load balancer.

26. A non-transitory computer-readable medium upon which a plurality of instructions are stored, the instructions for performing:
   (a) receiving a transaction request, wherein the transaction request is comprised of one or more operations;
   (b) analyzing the transaction request to determine the one or more operations;
   (c) associating one or more database locks with each of the one or more operations;
   (d) determining one or more sequence numbers for one or more of the database locks associated with each of the one or more operations;
   (e) determining processing abilities associated with one or more database servers associated with a database load balancer; and
   (f) transmitting one or more of the operations with the associated database locks and the sequence numbers to a one of the database servers based on the determination of processing abilities from step e.

27. A system for processing a database transaction request, the system comprising:
   (a) a memory for storing a plurality of instructions; and
   (b) a processor coupled to the memory, said processor configured for:
      (i) receiving the transaction request, wherein the transaction request is comprised of one or more operations;
      (ii) analyzing the transaction request to determine the one or more operations;
      (iii) associating one or more database locks with each of the one or more operations;
      (iv) determining one or more sequence numbers for one or more of the database locks associated with each of the one or more operations; and
      (v) providing the one or more operations with the associated database locks and the one or more sequence numbers to one or more database servers accessible to a database load balancer based on respective processing abilities associated with each of the one or more database servers.

28. The system of claim 27, wherein the one or more operations are selected from the group consisting of: modifying option settings, read operations, select operations, write operations, commit operations, roll back operations, execute operations, and prepare operations.

29. The system of claim 27, wherein the one or more database servers implement one or more distributed databases.

30. The system of claim 27, wherein components of the database load balancer are distributed across one or more of the database servers.

31. The system of claim 27, wherein management operations are provided along with the one or more operations, the one or more sequence numbers and the one or more locks.

32. The system of claim 31, wherein the management operations are selected from the group consisting of: requests for user connections, statement allocations, option settings, recovery information, roll-forward information, implicit commit, and roll back operations.

33. The system of claim 27, wherein each of the one or more locks has associated with it lock number, a lock type, a lock scope and a lock sequence.

34. The system of claim 33, wherein the processor is further configured for determining a transaction isolation level associated with the transaction request.

35. The system of claim 34, wherein each lock scope is based on the transaction isolation level.

36. The system of claim 34, wherein the lock scope is further based on the lock type.

37. A system for processing a database transaction request, the system comprising:
   (a) a memory for storing a plurality of instructions; and
   (b) a processor coupled to the memory, said processor configured for:
      (i) receiving at a database server one or more operations of a transaction request from a database load balancer based on processing abilities associated with the database server, where the operations have associated with them one or more sequence numbers and one or more locks;
      (ii) analyzing the one or more sequence numbers;
      (iii) placing each of the one or more operations in one or more queues based on the analysis of the one or more sequence numbers; and
      (iv) analyzing the queues to determine an order of execution of the one or more operations based on the one or more sequence numbers and one or more locks associated with the one or more operations.

38. The system of claim 37, wherein each of the one or more locks has associated with it lock number, a lock type, a lock scope and a lock sequence.

39. The system of claim 37, wherein a session queue is created for each session established with the database server.

40. The system of claim 39, wherein the session queue is resident upon the database server.

41. The system of claim 39, wherein the session queue is resident upon the database load balancer.

42. The system of claim 37, wherein the one or more queues comprise a record queue that is resident upon the database server.

43. The system of claim 37, wherein the one or more queues comprise a record queue that is resident upon the database load balancer.

44. A system for processing a transaction request, the system comprising:
   (a) a memory for storing a plurality of instructions; and
   (b) a processor coupled to the memory, said processor configured for:
      (i) receiving the transaction request, wherein the transaction request is comprised of one or more operations;
      (ii) analyzing the transaction request to determine the one or more operations;
      (iii) associating one or more database locks with each of the one or more operations;

(iv) determining one or more sequence numbers for one or more of the database locks associated with each of the one or more operations;

(v) determining processing abilities associated with one or more database servers associated with the database load balancer; and (vi) transmitting one or more of the operations with the associated database locks and the sequence numbers to a one of the database servers based on the determination of processing abilities from step v.

45. The system of claim 44, wherein the one or more database servers implement one or more distributed databases.

46. The system of claim 44, wherein components of the database load balancer are distributed across one or more of the database servers.

47. The system of claim 44, wherein one of the processing abilities is availability of each of the one or more database servers.

48. The system of claim 44, wherein one of the processing abilities is processing capability of each of the one or more database servers.

49. The system of claim 44, wherein the processor is further configured for analyzing a scheduler table to determine status and response time of one or more database servers that are accessible to the database load balancer.

* * * * *